United States Patent [19]

Grund et al.

[11] Patent Number: 4,939,966
[45] Date of Patent: Jul. 10, 1990

[54] ARRANGEMENT FOR MOUNTING A POWER-OPERATED CLAMPING DEVICE ON A MACHINE-TOOL SPINDLE

[75] Inventors: Gerhard Grund, Düsseldorf; Rainer Kempken, Erkrath-Hochdahl, both of Fed. Rep. of Germany

[73] Assignee: Paul Forkardt GmbH & Co., KG, Düsseldorf, Fed. Rep. of Germany

[21] Appl. No.: 344,303

[22] Filed: Apr. 26, 1989

[30] Foreign Application Priority Data

Apr. 26, 1988 [DE] Fed. Rep. of Germany ....... 3813982

[51] Int. Cl.$^5$ .............................................. B23B 23/02
[52] U.S. Cl. ......................................... 82/165; 82/127
[58] Field of Search ................. 82/165, 166, 167, 127, 82/904, 142; 279/1 L, 1 H, 4

[56] References Cited

U.S. PATENT DOCUMENTS 4,669,741 6/1987 Rohm ................................. 82/904
4,819,319 4/1989 Rohm ................................. 82/165

Primary Examiner—Frederick R. Schmidt
Assistant Examiner—Lawrence Cruz
Attorney, Agent, or Firm—Robert W. Becker & Associates

[57] ABSTRACT

An arrangement for mounting a power-operated clamping device for workpieces or tools on a hollow machine-tool spindle in which is disposed a securing rod that is adapted to be coupled with a drive member of the respectively mounted clamping device, and that is adapted to be actuated by a hydraulic or pressurized cylinder secured to the rear end of the spindle. Secured to a flange on the front end of the spindle is an intermediate ring to which the body of the clamping device is adapted to be secured via at least two securing pins. To provide a structurally straightforward design that requires no additional pressure medium cylinder, the securing pins are secured to the clamping device body and are axially oriented, with each securing pin being provided with a notch that has a tightening surface. Key rods are displaceably guided in the intermediate ring, with each key rod having a key that is introducible into a respective notch of the securing pins. A bayonet ring is rotatably yet axially non-shiftably mounted on a front end of the securing rod and is adapted to cooperate with a bayonet flange formed on the drive member of the clamping device, with the bayonet ring being provided with an external tooth construction that meshes with a tooth construction on at least one of the key rods.

9 Claims, 9 Drawing Sheets

ARRANGEMENT FOR MOUNTING A POWER-OPERATED CLAMPING DEVICE ON A MACHINE-TOOL SPINDLE

BACKGROUND OF THE INVENTION

The present invention relates to an arrangement for fixing or mounting a power-operated clamping device for workpieces or tools on a hollow machinetool arbor or spindle in which is disposed a spreader or securing rod that is adapted to be coupled with a drive member of the respectively mounted clamping device, and that is adapted to be actuated by a hydraulic or pressurized cylinder secured to a rear end of the spindle, with a front end of the spindle being provided with a flange to which is secured an intermediate ring to which a body of the clamping device is adapted to be secured via at least two securing bolts or pins, with the clamping device being centered on the intermediate ring via central conical surface means.

An arrangement of this general type for mounting a power-operated clamping device on the front end of a hollow machine-tool spindle is disclosed, for example, in German Patent No. 33 28 291. With this known arrangement, radially oriented securing pins are mounted in the intermediate ring that is secured to the flange of the spindle. Draw-in or tightening surfaces of the securing pins engage in an annular groove that is formed in a flange ring, which in turn is secured to the body of the clamping device. To center this flange ring relative to the intermediate ring that is secured to the flange of the spindle, central conical surfaces are formed both on the flange ring and on the intermediate ring. Actuation of the securing pins is effected by pistons that are connected to the securing pins, with pressure medium being supplied to the pistons via lines that extend in the spindle.

Furthermore, in order to provide for an automatic rapid exchange of clamping devices on machine-tool spindles it is necessary to be able to rapidly detachably couple the drive member of the respectively mounted clamping device with the securing rod that is disposed in the hollow machine-tool spindle, so that the respectively mounted clamping device can be actuated by the pressure medium cylinder that is secured to the rear end of the spindle. With the embodiment known from the aforementioned German Patent No. 33 28 291, this coupling is effected via a coupling head that is disposed on the securing rod and that has distributed over the periphery radially outwardly directed coupling cams that cooperate with radially inwardly projecting coupling projections of a coupling adapter that is in turn disposed on the drive member of the respectfully mounted clamping device. In a rotational position of the securing rod that corresponds to the uncoupled state, the coupling head, with its coupling cams, can be introduced axially into the coupling adapter between the coupling projections. By rotating the securing rod the coupling cams pass behind the coupling projections, so that in this position the drive member of the clamping device is positively connected with the securing rod that can be actuated by the pressure medium cylinder. In order to rotate the securing rod between the two end positions, namely the uncoupling position on the one hand and the coupling stage on the other hand, in addition to the axial piston cylinder that actuates the drive member of the mounted clamping device, the heretofore known arrangement is provided with a rotary piston cylinder that is disposed at the rear end of the machine-tool spindle.

The known arrangement of the aforementioned German Patent No. 33 28 291 has various drawbacks. On the one hand, the rotary piston cylinder that is necessary for the coupling process between the securing rod and the drive member of the clamping device is technically complicated and represents an additional loading of the machine-tool spindle. In addition, this rotary piston cylinder precludes an overall hollow configuration for the securing rod, so that no rod-like workpieces can be supplied through the machine-tool spindle to the respectively mounted clamping device. Furthermore, due to the radial orientation of the securing pins, a large bulky arrangement that extends out quite far radially results not only for the intermediate ring but also in particular for the flange ring that provides the annular groove for the securing pins, so that this heretofore known construction is very heavy and has a high flywheel mass.

A further clamping arrangement disclosed in German Offenlegungsschrift 30 45 536 has similar drawbacks. This arrangement also has radially oriented securing pins for securing the body of the clamping device on the spindle flange. However, with this arrangement the interlocking between the drive member of the clamping device and the securing rod that extends in the spindle is effected via balls that are held in recesses of the securing rod and that can be actuated via an additional actuation rod that is guided in the hollow securing rod in such a way that they enter in corresponding, spherical segment-like recesses of a coupling member that is connected with the drive member.

With the arrangement disclosed in the aforementioned German Offenlegungsschrift 30 45 536, not only for the actuation of the radial securing pins via wedge surfaces, but also for the axial coupling movement of the actuating rods, in each case an additional adjusting cylinder is provided at the rear end of the machine-tool spindle, so that altogether three such axial piston cylinders must be used, the tubular actuating rods of which must collectively be disposed in the hollow machine-tool spindle. If there is a disruption in the pressure medium system, the danger exists that the clamping device will come loose from the spindle flange, so that despite a high structural expense, an only inadequate operational reliability is provided. A very similar construction, which has the same drawbacks, is disclosed in German Offenlegungsschrift 30 45 537.

Finally, German Offenlegungsschrift 34 10 670 discloses a further construction where a clamping device body, which is again provided with a flange ring, is fixedly connected via a self-centering radial tooth construction with an intermediate ring that is secured to the machine-tool spindle. The securing of the flange ring on the intermediate ring is effected via a plurality of clamping segments that couple a collar of the intermediate ring in a clamp-like manner with a connecting sleeve, which in turn is connected with the piston rod of one of the axial piston cylinders. An appropriate coupling between segments is effected between the front end of the securing rod and the drive member of the respectively mounted clamping device. In addition to a high expense for construction and the impossibility of providing a continuous bore for the supply of rod-like workpieces, this heretofore known construction has the drawback that both interlocking operations are a function of the position of the respective piston, so that if problems occur in the pressure medium system, not only a loosening but even a detachment of connections can occur.

Starting with the previously described arrangement of German Patent 33 28 291, it is an object of the present invention to embody such a mounting arrangement in such a way that via a straightforward construction and with small overall size, a reliable coupling is effected not only between the body of the clamping device and the spindle flange but also between the drive member and the securing rod, with this being accomplished without the need for an additional actuating cylinder at the rear end of the machine-tool spindle, whereby the possibility should be provided for being able to supply rod-like workpieces to a mounted clamping device through the machine-tool spindle.

BRIEF DESCRIPTION OF THE DRAWINGS

This object, and other objects and advantages of the present invention, will appear more clearly from the following specification in conjunction with the accompanying schematic drawings, which illustrate one exemplary embodiment of the inventive mounting arrangement with four possibilities for the construction of the key rod drive mechanism, and in which.

SUMMARY OF THE INVENTION

Figure 1:
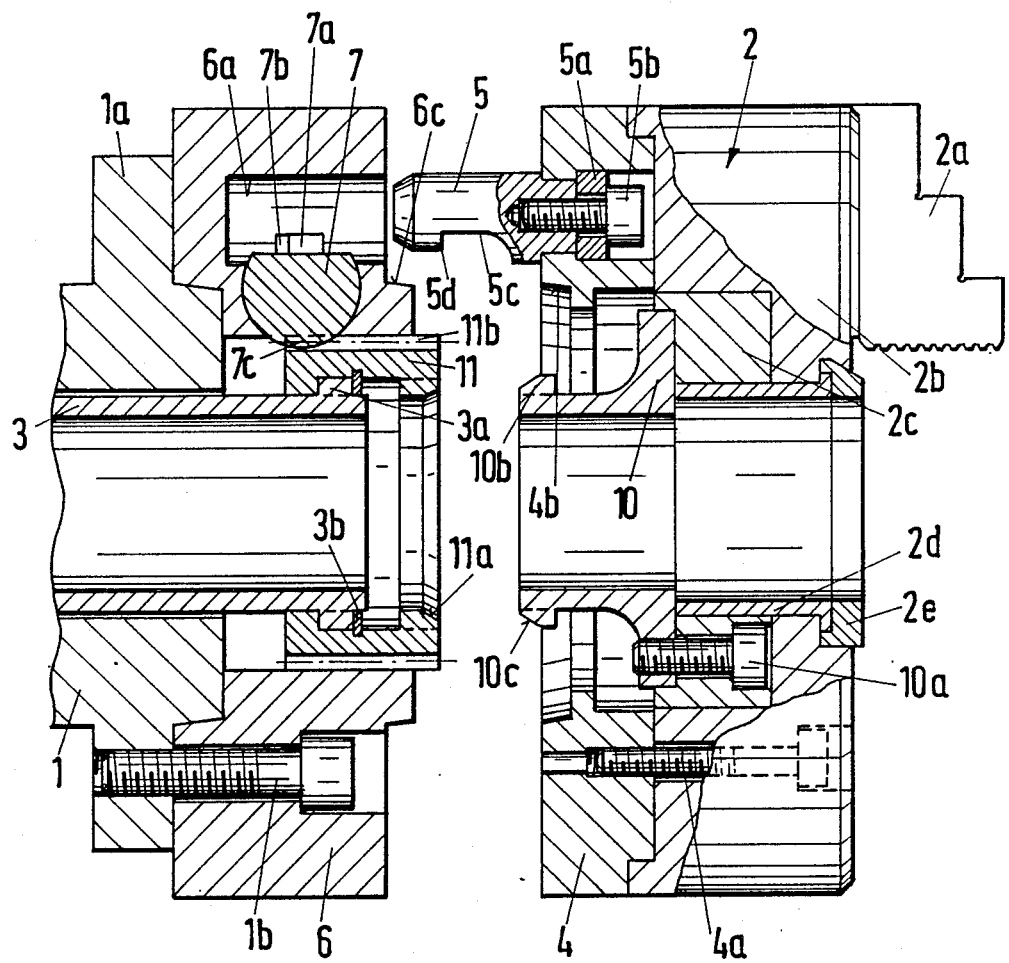
FIG. 1 is a longitudinal cross-sectional view through the intermediate ring, which is secured to the front end of a machine-tool spindle, and through a clamping device that is to be secured to this intermediate ring.

The mounting arrangement of the present invention is characterized primarily in that: the securing pins are secured to the clamping device and are axially oriented, i.e. are parallel to the orientation of the securing rod, with each securing pin being provided with notch means that has draw-in or tightening surface means; key rods, the number of which corresponds to the number of securing pins, are displaceably guided in the intermediate ring, with each key rod being provided with a wedge or key that is introducible in a respective one of the notch means of the securing pins; and a bayonet ring is rotatably yet axially non-shiftably mounted on a front end of the securing rod, and is adapted to cooperate with a bayonet flange formed on the drive member of the clamping device to effect the coupling of the securing rod to the drive member, with the bayonet ring being provided with an external tooth construction, and with at least one of the key rods being provided with a tooth construction that meshes with the tooth construction of the bayonet ring.

The inventive construction has the advantage that no additional pressure medium cylinder is required on the rear end of the machine-tool spindle for mounting the clamping device body on the flange of the machine-tool spindle, and for coupling the clamping device drive member with the securing rod that is disposed in the hollow machine-tool spindle. Whereas the rotational movement of the inventive bayonet ring, which rotational movement effects the coupling between the drive member and the securing rod, is derived from the longitudinal displacement of at least one of the key rods, the longitudinal displacement of the key rods, which could be interconnected via the bayonet ring, is effected either by a spindle drive mechanism or by a pressure medium actuation. Both drive mechanisms are disposed in the intermediate ring that is secured to the spindle flange, so that where a pressure medium actuation is provided, it is merely necessary to provide appropriate pressure medium supply lines in the machine-tool spindle. Since for the inventive construction it is therefore necessary to provide only a single axial piston cylinder at the rear end of the machine-tool spindle, it is possible to embody the securing rod as a take-up tube having a central passage for the supply of rod-like workpieces to the clamping device. The axial orientation of the securing pins avoids a large bulky construction that extends out relatively far in a radial direction, so that the inventive construction is lightweight and hence has a low flywheel mass.

Although the possibility exists for disposing the inventive key rods in the intermediate ring in such a way that they are displaceable in a radial direction, it is proposed pursuant to a further feature of the present invention to guide the key rods in the intermediate ring in such a way that they are displaceable in an approximately tangential direction, so that on the whole the intermediate ring has a small size and in particular has a smaller outer diameter.

Pursuant to a further feature of the present invention, at least one of the key rods is adapted to be driven by a spindle drive mechanism that can preferably be actuated by a power drive that can be provided on the intermediate ring. Pursuant to an alternative embodiment of the present invention, at least one of the key rods is provided with at least one piston surface for a pressure medium drive mechanism. This pressure medium drive mechanism can operate, for example, against a built-in tensioning spring in a detachment direction, so that after the supply of pressure medium has been discontinued, the clamping position is assured by spring force. It is, of course, also possible to connect a double-acting piston with the key rod, so that in both directions of displacement the key rod can be shifted by pressure medium. In the event that all of the key rods mesh via teeth in the external thread of the bayonet ring, so that the key rods are interconnected with one another via the bayonet ring, it is sufficient that only one key rod be driven, either by a spindle drive mechanism or by a pressure medium drive mechanism.

In the most straightforward design, the securing pins are secured to the body of the clamping device. However, pursuant to one preferred embodiment of the present invention, the securing pins can also be secured on a support ring that in turn is disposed on the rear end face of the respective clamping device. In this way, it is possible to equip conventional clamping devices with the securing pins, so that they can be used for an automatic rapid exchange. In order to increase the reliability of such a rapid exchange process, it is finally proposed pursuant to the present invention to provide the bayonet ring and the bayonet flange with inclined centering surfaces that cooperate with one another when the respective clamping device is mounted on the intermediate ring.

Pursuant to an alternative embodiment, the notch that is provided with the tightening surface can be embodied as an annular groove. In such a case, the securing pins can be introduced into a keyhole-like opening in the key rod, the edge of which is embodied as a wedge surface for the tightening surface of the securing pin.

In summary, the present invention provides an arrangement for mounting a power-operated clamping device on the front end of a hollow machine-tool spindle, with this being accomplished at a low cost for construction, while the resulting arrangement has a high operational reliability in a lightweight construction that provides the possibility for a central supply of rod-like workpieces, all without the need for having to use an additional pressure medium cylinder at the rear end of the spindle. Examples of clamping devices that can hold not only workpieces but also tools, include, in particular, chucks, mandrels, collets, gripping plates, or similar clamping devices for workpieces or tools.

Further specific features of the present invention will be described in detail subsequently.

DESCRIPTION OF PREFERRED EMBODIMENTS

Figure 2:
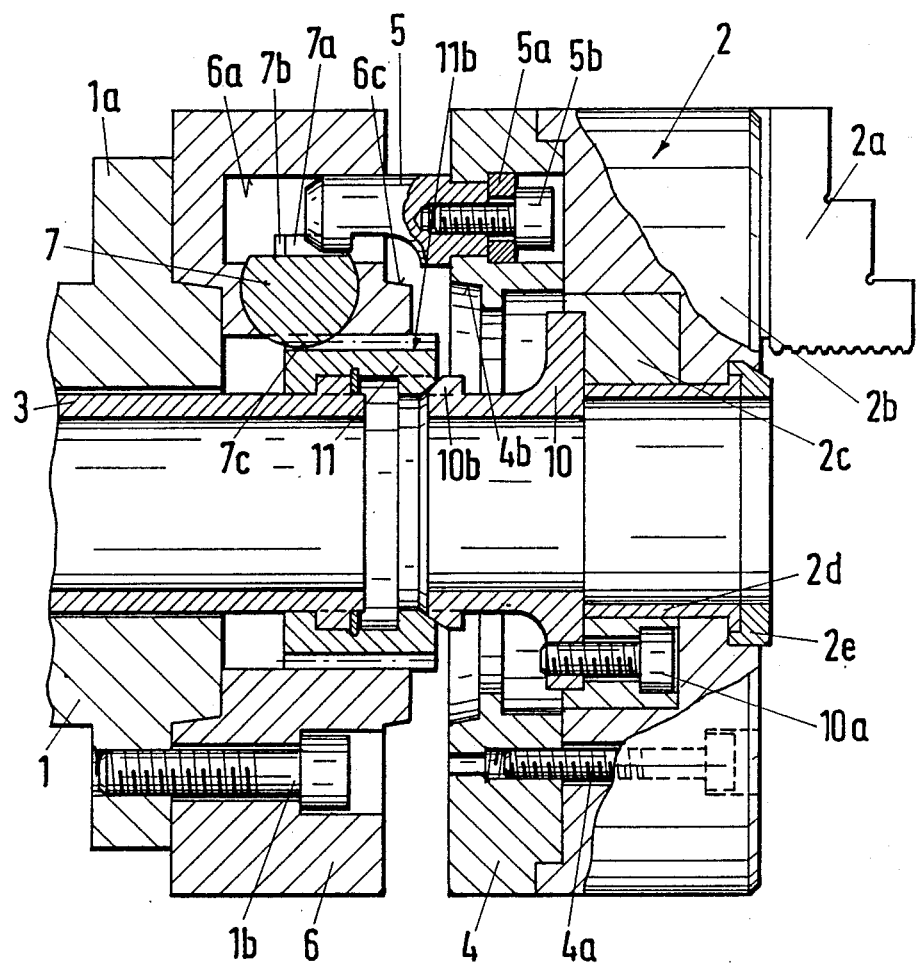
FIG. 2 a longitudinal cross-sectional view similar to that of FIG. 1 during the mounting process.
Figure 3:
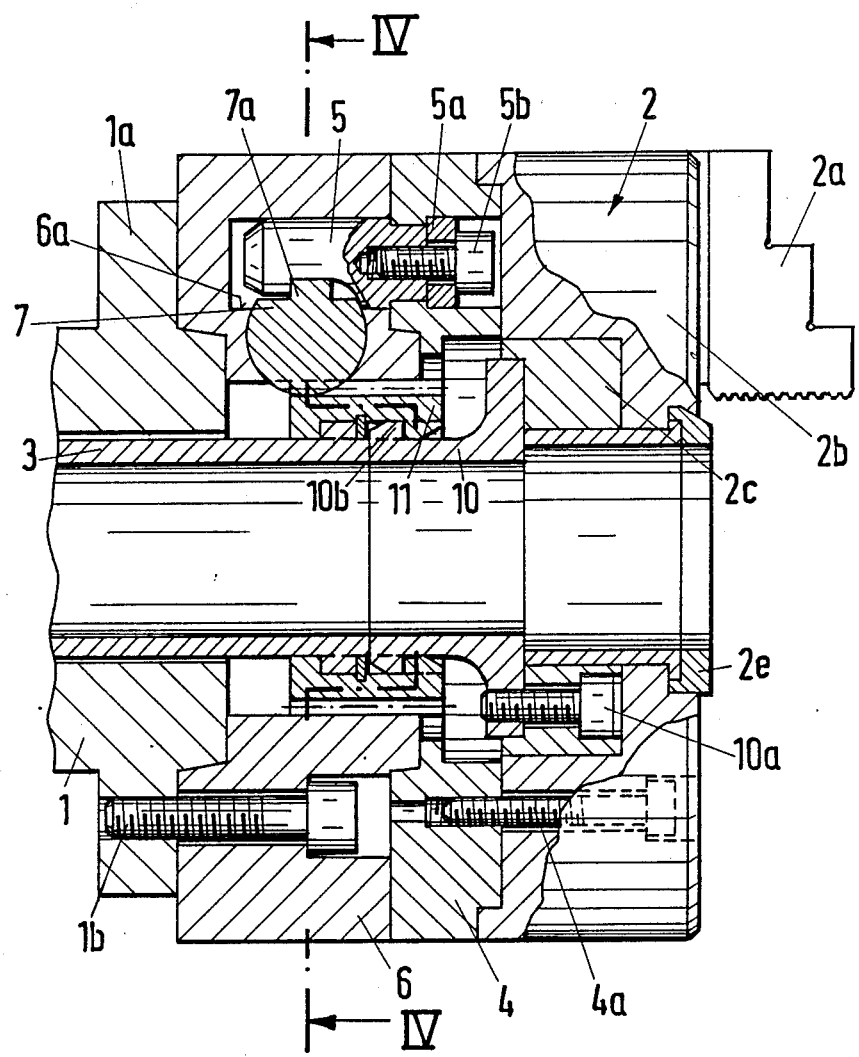
FIG. 3 is a further longitudinal cross-sectional view similar to FIGS. 1 and 2 after mounting of the device is completed.

Referring now to the drawings in detail, the longitudinal cross-sectional views of FIGS. 1 to 3 show the front end of a hollow machine-tool arbor or spindle 1 that is provided with a flange 1a; the spindle 1 is part of a machine tool, the remainder of which is not illustrated. A power operated clamping device 2 is secured to the flange 1a in such a way that it can be automatically exchanged for a different clamping device 2 within a very short period of time. The clamping device 2 illustrated in FIGS. 1 to 3 is embodied as a known multi-jaw chuck. In the drawings, a single clamping jaw 2a is shown that, just as the other, non-illustrated clamping jaws, is radially displaceably guided in the body 2b of the clamping device 2, and is actuated by a drive member 2c that in a known manner, which is not shown in the drawing, cooperates with all of the clamping jaws 2a and is moved in an axial direction by a spreader or securing rod 3.

The rod 3 is disposed in the hollow machine-tool spindle 1, and is in turn actuated by a non-illustrated axial piston cylinder that is secured to the other end of the spindle 1. In the illustrated embodiment, the spreader or securing rod 3 is embodied as a tube having a central passage for the supply of rod-like workpieces to the clamping device 2. The central bore of the body 2b of the clamping device 2 is lined with a sleeve or bushing 2d and is provided at the front end with a cover ring 2e.

A support ring 4 is secured to the back side of the body 2b of the clamping device 2 via screws 4a. Secured to the back side of the support ring 4, using a spacer 5a and a screw 5b, is an axially oriented securing bolt or pin 5. Each of the securing pins 5 (a total of three pins are provided in the illustrated embodiment) is provided on its radially inwardly disposed surface with a notch 5c that forms a radially directed draw-in or tightening surface 5d. This can best be seen in FIG. 1.

Secured at the forward flange 1a of the machine-tool spindle 1, via screws 1b, is an intermediate ring 6 that is provided with receiving bores 6a for the securing pins 5. Projecting into each of these receiving bores 6a is a wedge or key 7a that is formed on a rod 7; the angled draw-in or tightening surfaces 7b of the keys 7a cooperate with the tightening surface 5d of the respective securing pin 5. In the illustrated embodiments, the key rods 7 have a circular cross-sectional configuration and are displaceably guided in the intermediate ring 6 in an approximately tangential direction; this can be seen in particular in FIGS. 4 to 7.

Four different embodiments for the drive mechanism of the key rods 7 are shown in the respective cross-sectional views of FIGS. 4 to 7, which are taken along the line IV—IV in FIG. 3.

Figure 4:
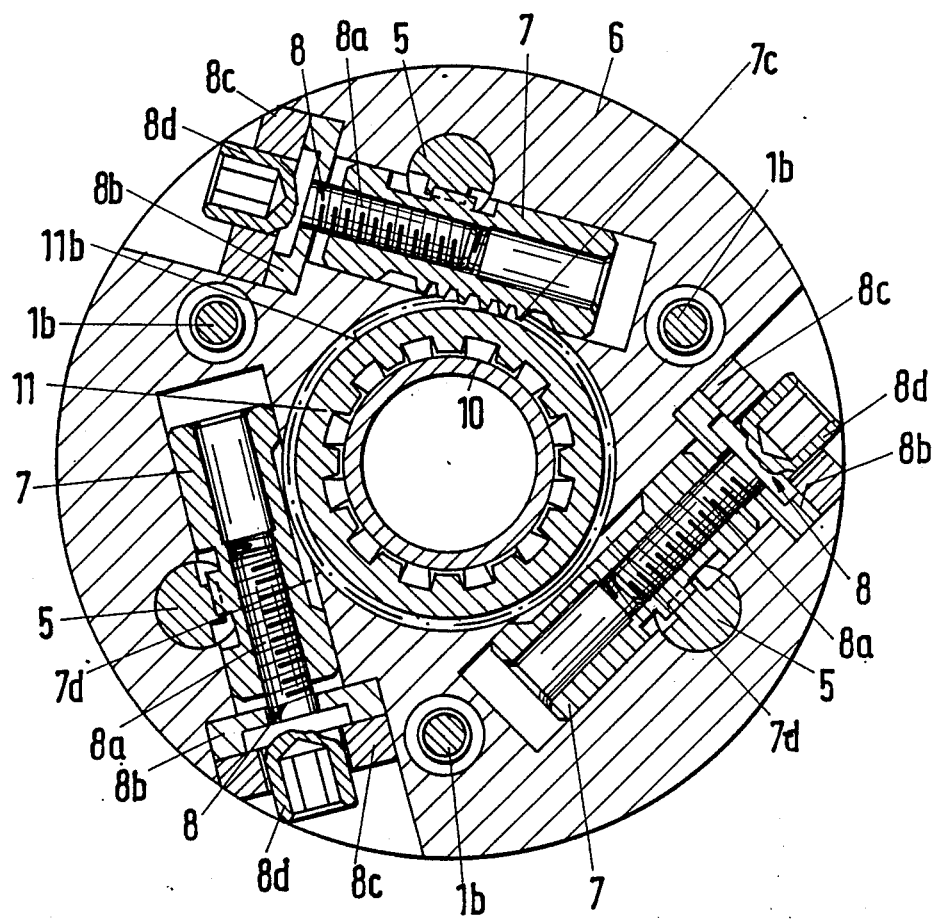
FIG. 4 a cross-sectional view through the intermediate ring taken along the line IV—IV in FIG. 3, and shows a first exemplary embodiment for to key rod drive mechanism.

With the first embodiment of FIG. 4, each key rod 7, which can be shifted in a longitudinal direction yet is guided in a non-rotatable manner in the intermediate ring 6, is provided with a spindle drive mechanism 8. In this embodiment, the drive mechanism 8 includes a spindle rod 8a, the external thread of which meshes with an internal thread of the key rod 7, with the spindle rod 8a being rotatably yet axially nonshiftably mounted in the intermediate ring 6 via a support ring 8b. The support ring 8b is held by a support cover 8c through which extends the spindle head 8d, which is provided with a hexagonal recess. Thus, rotation of the spindle rod 8a via drive applied to the spindle head 8d effects a longitudinal movement of the key rod 7 within the intermediate ring 6.

Figure 6:
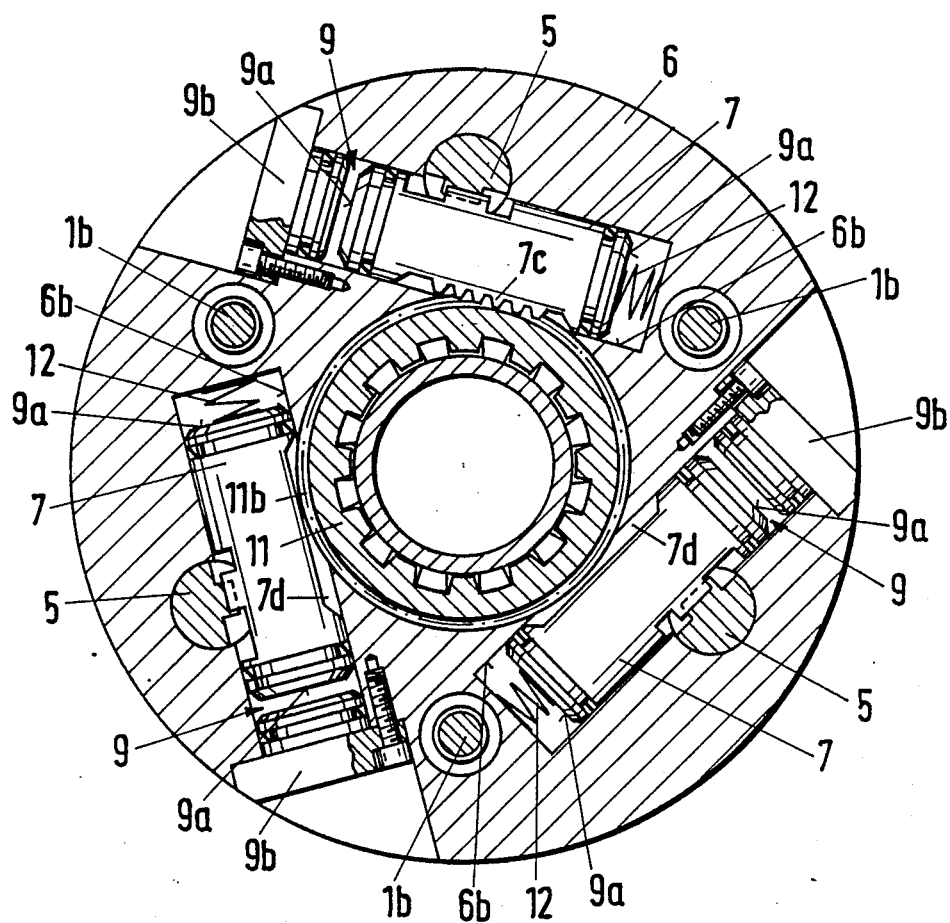
FIG. 6 is a cross-sectional view through the intermediate ring similar to FIG. 4 but of a third exemplary embodiment for the key rod drive mechanism, using a hydraulic or pressurized drive mechanism.
Figure 7:
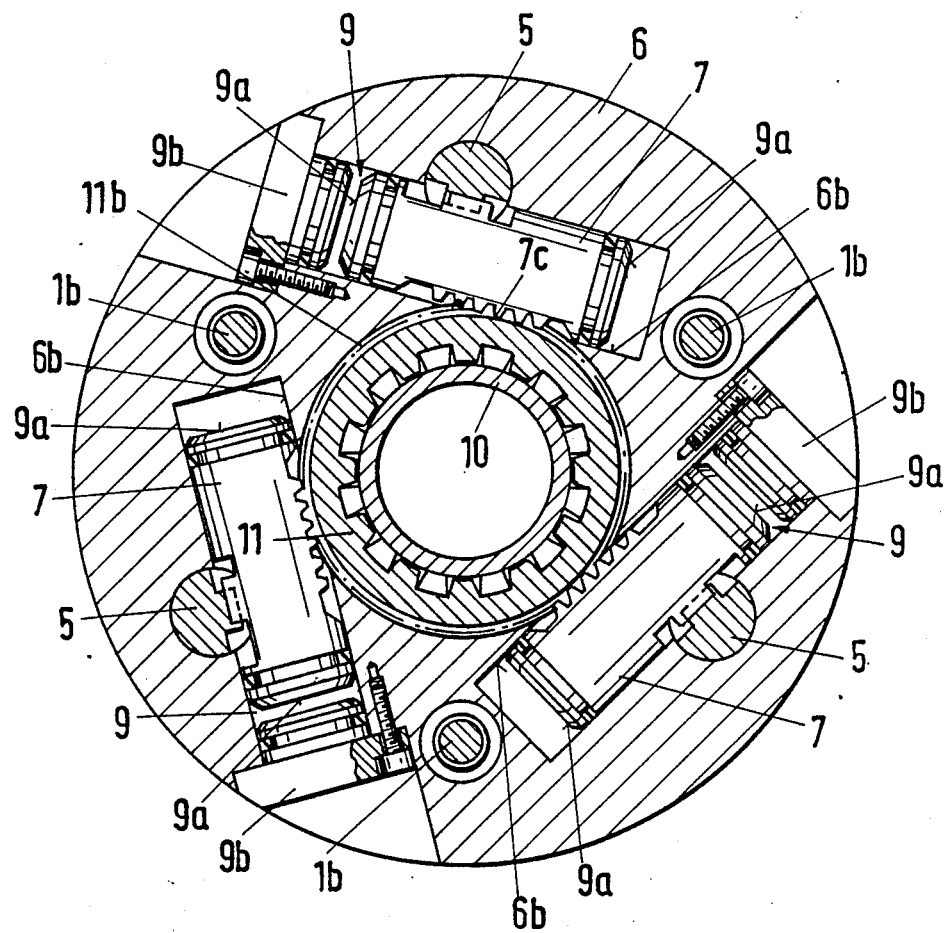
FIG. 7 is a cross-sectional view through the intermediate ring similar to FIG. 6 of a further exemplary embodiment of the key rod drive mechanism.

An alternative embodiment of the key rod drive mechanism is illustrated in FIG. 6. With this embodiment, each key rod 7 is provided with a hydraulic or pressurized drive mechanism 9 that in this embodiment is double acting, with both ends of each key rod 7 being embodied as a piston surface 9a. By acting upon one of the two piston surfaces 9a of each key rod 7, the latter can be shifted in the desired direction within the intermediate ring 6. To facilitate illustration, the pressure medium lines or bores that are needed for supplying the pressure medium have not been illustrated. FIG. 6 shows merely that in the intermediate ring 6, each cylinder bore 6b, which receives a respective key rod 7, is closed off by a sealing cover 9b.

In order during pressure loss to be able to hold the key rods 7 in the arresting or interlocking position, in the embodiment of FIG. 6 compression springs 12 are provided that hold the key rods 7 in the arresting position, and the spring force of which must be overcome if the key rods 7 are to be transferred into the release position.

Since not only the bodies 2b of the respective clamping device 2 must be connected with the flange 1a of the machine-tool spindle 1, but also a connection must be established between the drive member 2c of the respective clamping device 2 and the securing rod 3, the drive member 2c of each clamping device 2 is provided with a coupling piece 10 that is secured to the drive member 2c via screws 10a. The free end of this coupling piece 10 is provided with a bayonet flange 10b that in turn is provided with an inclined centering surface 10c (see FIG. 1). This bayonet flange 10b cooperates with a bayonet ring 11 that is similarly provided with an inclined centering surface 11a. The bayonet ring 11 and the bayonet flange 10b are provided with cams and recesses that extend in the radial direction, so that in a particular position these two parts 10b and 11 can be pushed over one another in the axial direction, yet after rotation by the width of one cam or recess rest tightly against one another in the axial direction. In this manner, a coupling and uncoupling between the bayonet ring 11 and the bayonet flange 10b is possible.

Whereas the coupling piece 10 that is provided with the bayonet flange 10b is non-rotatably secured on the drive member 2c, which is similarly nonrotatably guided in the body 2b of the clamping device 2, the bayonet ring 11 cannot be shifted axially yet is rotatably mounted on the front end of the securing rod 3, which for this purpose is provided with a tube flange 3a and a snap ring 3b (see FIG. 1). Rotation of the bayonet ring 11 for the purpose of coupling or uncoupling is derived from the respective key rod drive mechanism, as can be best seen in FIGS. 4 to 7.

FIG. 4 shows that one of the key rods 7, which is movable by a spindle drive mechanism 8, is provided with a rack-like tooth construction 7c that engages with a tooth construction 11b on the periphery of the bayonet ring 11. Thus, shifting of the key rod 7 effects rotation of the bayonet ring 11. By suitably coordinating the bayonet configuration and the tooth constructions 7c and 11b, a coupling between the bayonet ring 11 and the bayonet flange 10b is effected simultaneously with an interlocking or arresting of the securing pins 5 via the key rods 7. In the embodiment illustrated in FIG. 4, the two other key rods 7, instead of being provided with teeth 7c are provided with a recessed portion 7d, so that no connection between the three key rods 7 is effected via the bayonet ring 11.

Figure 5:
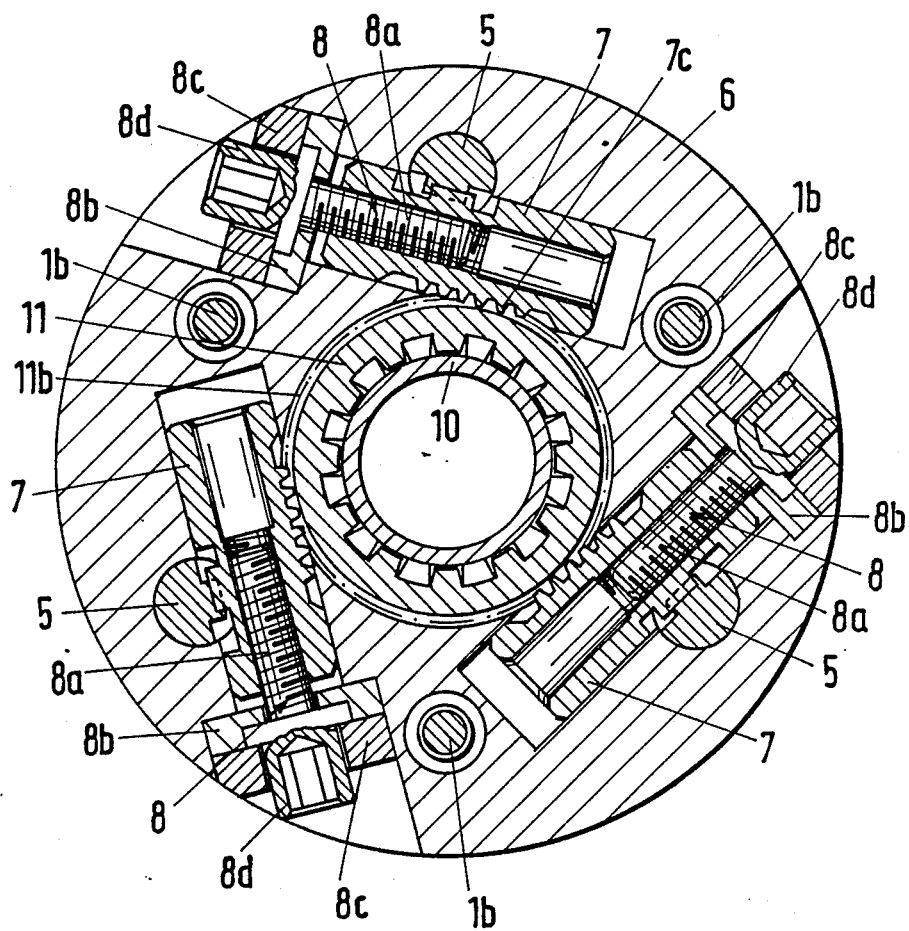
FIG. 5 is a cross-sectional view through the intermediate ring similar to FIG. 4 but of a second exemplary embodiment for the key rod drive mechanism.

The embodiment illustrated in FIG. 5 differs from that of FIG. 4 merely in that each of the key rods 7 is provided with a toothed construction 7c that meshes with the teeth 11b of the bayonet ring 11. In this way, a connection of the three key rods 7 is effected via the bayonet ring 11, so that it can be sufficient to activate merely the spindle drive mechanism 8 of one of the key rods 7 in order to interlock the securing pins 5 and to couple the securing rod 3 with the drive member 2c.

Also where a hydraulic or pressurized drive mechanism 9 is used for the key rods 7 as in the embodiment of FIG. 6, at least one of the key rods 7 is provided with a toothed construction 7c. In the embodiment of FIG. 6, the two other key rods 7 are again provided with recessed portions 7d. The embodiment illustrated in FIG. 7 again differs from that of FIG. 6 in that all three of the key rods 7 are respectively provided with teeth 7c, so that a connection of the three key rods 7 is effected via the bayonet ring 11.

In order to fix or mount a clamping device 2 on the intermediate ring 6 that is secured to the flange 1a, the key rods are shifted via the respective drive mechanism 8 or 9 in such a way that the keys 7a are disposed beyond the receiving bores 6a for the securing pins 5. In so doing, the bayonet ring 11 is simultaneously rotated in such a way that the radially outwardly directed cams of the bayonet flange 10b can pass through corresponding recesses of the bayonet ring 11 during an axial mounting of the clamping device 2 on the intermediate ring 6. Via the inclined centering surfaces 10c and 11a that can be seen from FIG. 1, a guidance of the coupling piece 10 relative to the bayonet ring 11 is effected when the clamping device 2 has transferred from the starting position illustrated in FIG. 1 into the intermediate position illustrated in FIG. 2. At the same time, the securing pins 5 enter the receiving bores 6a of the intermediate ring 6. During the further mounting movement of the clamping device 2, a final centering of the support ring 4 relative to the intermediate ring 6 is effected via central conical surfaces 4b and 6c that are provided on the support ring 4 and the intermediate ring 6 respectively (see FIGS. 1 and 2).

As soon as the clamping device 2 has attained the end position illustrated in FIG. 3, the key rods 7 are shifted with the aid of their spindle drive mechanism 8 or hydraulic or pressurized drive mechanism 9 in such a way that the angled tightening surfaces 7b of the keys 7a rest against the tightening surfaces 5d of the pertaining securing pins 5, which in this manner are positively held in position against the intermediate ring 6. At the same time that the key rods 7 are activated, a rotation of the bayonet ring 11 is effected, so that a coupling between this bayonet ring 11 and the bayonet flange 10b of the coupling piece 10, and hence a positive connection between the securing rod 3 and the drive member 2c of the clamping device 2, is effected. The clamping device 2 is then secured to the machine-tool spindle 1 and can be actuated by the securing rod 3 via the axial piston cylinder that is not illustrated in the drawings.

The release and removal of the clamping device 2 is effected in the reverse order, whereby again the uncoupling movement for the release of the drive member 2c from the securing rod 3 is derived from the shifting movement of the key rods 7 that is necessary for releasing or disengaging the securing pins 5.

Figure 8:
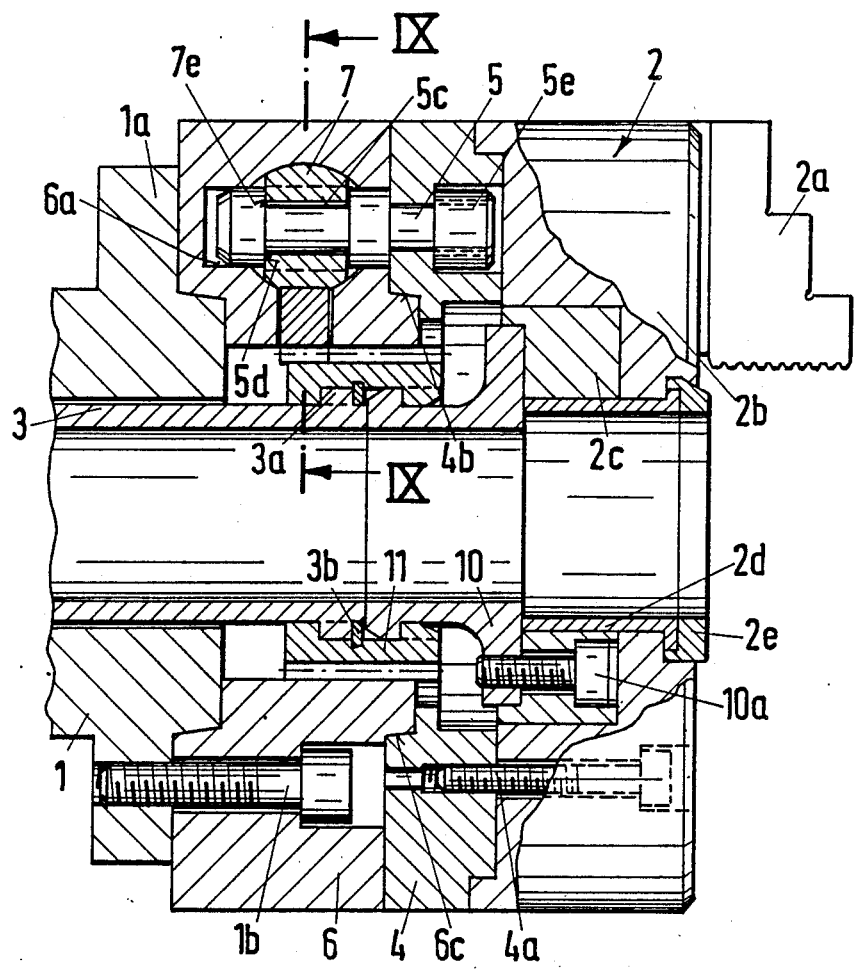
FIG. 8 is a longitudinal cross-sectional view through an alternative embodiment for the securing pin interlocking.
Figure 9:
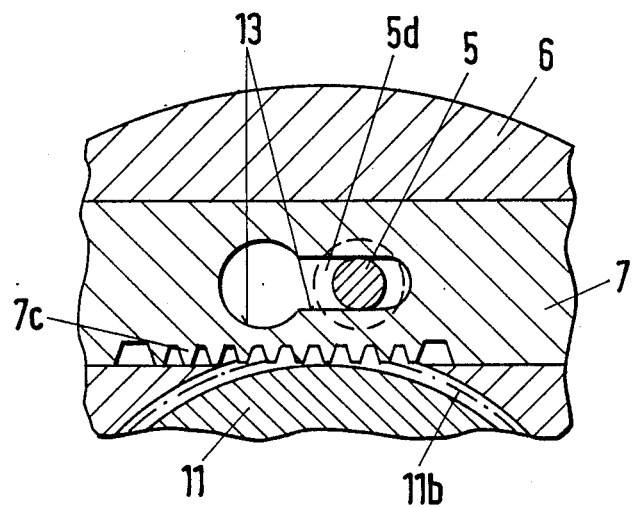
FIG. 9 is a cross-sectional view taken along the line IX—IX in FIG. 8.

The embodiment illustrated in FIGS. 8 and 9 shows a different type of arresting or interlocking for the securing pins 5, which are provided with a notch 5c in the form of an annular groove. The tightening surface 5d is formed on that annular surface that is closest to the free end of the securing pin 5. Securement of the securing pin 5 to the support ring 4 is effected by a nut 5e that is screwed onto a corresponding thread.

Formed in each key rod 7 is a keyhole-like opening 13, through the greatest diameter portion of which the front end of the securing pin 5 can pass, and with the width of the elongated hole portion of the opening 13 corresponding to the smaller diameter of the securing pin 5 in the region of the annular groove thereof. The edge of the key rod 7 in this region is embodied as a wedge surface 7e that cooperates with the tightening surface 5d.

When the securing pin 5 has entered the opening 13 and the key rod 7 is shifted, the wedge surface 7e, via the tightening surface 5d, pulls the securing pin 5 into the arresting position. Also in this case, the key rod 7 is provided with a tooth construction 7c in order to drive the bayonet ring 11.

The present invention is, of course, in no way restricted to the specific disclosure of the specification and drawings, but also encompasses any modifications within the scope of the appended claims.

What we claim is:

1. In an arrangement for mounting a poweroperated camping device for workpieces or tools on a hollow machine-tool spindle in which is disposed a securing rod that is adapted to be coupled with a drive member of the respectively mounted clamping device, and that is adapted to be actuated by a hydraulic or pressurized cylinder secured to a rear end of said machine-tool spindle, with a front end of said spindle being provided with a flange to which is secured an intermediate ring to which a body of said clamping device is adapted to be secured via at least two securing pins, with said clamping device being centered on said intermediate ring via central conical surface means, the improvement wherein:

said securing pins are secured to said clamping device and are axially oriented, with each of said securing pins being provided with notch means that has tightening surface means;

key rods, the number of which corresponds to the number of said securing pins, are displaceably guided in said intermediate ring, with each of said key rods being provided with a key that is introducible into a respective one of said notch means of said securing pins; and a bayonet ring is rotatably yet axially non-shiftably mounted on a front end of said securing rod, and is adapted to cooperate with a bayonet flange formed on said drive member of said clamping device to effect said coupling of said securing rod to said drive member, with said bayonet ring being provided with an external tooth construction, and with at least one of said key rods being provided with a tooth construction that meshes with said tooth construction of said bayonet ring.

2. An arrangement according to claim 1, in which said key rods are guided in said intermediate ring in such a way as to be displaceable approximately tangentially to said bayonet ring.

3. An arrangement according to claim 2, which includes spindle drive mechanism means for driving at least one of said key rods.

4. An arrangement according to claim 2, in which at least one of said key rods is provided with at least one piston surface for pressure medium drive mechanism means.

5. An arrangement according to claim 2, in which said securing rod is embodied as a take-up tube having a central passage for the supply of rod-like workpieces to said clamping device.

6. An arrangement according to claim 2, in which said securing pins are secured to said body of said clamping device.

7. An arrangement according to claim 2, in which said clamping device has a front face for clamping means and a rear face on which is disposed a support ring, with said securing pins being secured to said support ring.

8. An arrangement according to claim 2, in which said bayonet ring and said bayonet flange are each provided with respective inclined centering surface means that cooperate with one another when a clamping device is mounted on said intermediate ring.

9. An arrangement according to claim 2, in which said notch means with said tightening surface means are formed by an annular groove in said securing pin; and in which said key rod is provided with a keyhole-shaped opening for receiving said securing pin therethrough, with said key rod being provided about said keyhole-shaped opening with edge means embodied as wedge surface means for said tightening surface means of said securing pin.

* * * * *